United States Patent Office 3,399,163
Patented Aug. 27, 1968

3,399,163
DISPERSION COATING COMPOSITIONS
Richard Henry Cousens, Gerrards Cross, Desmond Wilfrid John Osmond, Windsor, and Edward Spencer George Simpson and Maurice Wainwright Skinner, Maidenhead, England, assignors to Imperial Chemical Industries Limited, London, England, a corporation of Great Britain
No Drawing. Continuation of application Ser. No. 192,983, May 7, 1962. This application Feb. 15, 1966, Ser. No. 527,483
Claims priority, application Great Britain, May 10, 1961, 17,003/61
10 Claims. (Cl. 260—33.6)

This application is a continuation of our earlier application Ser. No. 192,983 filed May 7, 1962, and now abandoned.

This invention relates to coating compositions based on dispersions of film-forming polymer particles in an organic liquid which is a non-solvent for the polymer. In particular it relates to such compositions suitable for application by spray gun.

We have previously found that such dispersions can be stabilised by a material, such as a block or graft copolymer, comprising one constituent which is compatible with the polymer and incorporated in the disperse polymer particles and another which is solvated by the organic liquid. Incorporation of the stabilising material in the disperse particles results in the stabilising solvated constituent being firmly and irreversibly attached to the particles by the primary chemical bonds between the abovementioned constituents. This is in contrast to the use of conventional stabilising agents in which the stabilising solvatable groups become indirectly attached to the disperse particles through groups which themselves are merely adsorbed onto the surface of the disperse particles by second order forces.

One method of making such dispersions is by co-precipitating the polymer and a block or graft copolymer in the organic liquid, the polymer and copolymer being formed in situ by polymerising monomer and copolymerisable solvated constituent in the organic liquid in which the resulting polymer is to be dispersed. Polymerisation of the mixture results in the formation of polymer and of a block or graft copolymer of the solvated constituent and part of the monomer, the polymer and copolymer being coprecipitated as they are formed to produce a stable dispersion in the organic liquid.

Such dispersions of synthetic polymer in organic liquid have quite different rheological characteristics from those dispersions obtained by grinding preformed polymer in organic liquid in the presence of a conventional stabilising agent. In the latter case it is impossible to obtain a high degree of stabilisation with the result that there is considerable particle-to-particle interaction in the dispersion leading to the dispersion being false-bodied or thixotropic. Whilst this is an advantage, to some extent, in coating compositions in that it makes it easier to apply thick coatings without runs or sags on vertical surfaces, the relatively poor dispersion of the particles makes it impossible to achieve a high level of gloss.

Dispersions of the new type are highly stable and free from flocculation and we have found that they can be used as the basis for improved coating compositions. One of the major advantages of the coating composition is that as a result of this freedom from flocculation, the polymer particles pack together very well on evaporation of the organic liquid to give films which require much less polishing, in some circumstances none at all.

Because of this freedom from flocculation the dispersions are, of course, non-thixotropic but we have now found that on suitable formulation, there can be produced from the dispersions coating compositions having excellent application characteristics and other advantages.

For spray application, coating compositions should have the following characteristics:

(i) in order to achieve good atomisation in the spray gun they should be of low viscosity (ii) on reaching the article being coated the particles of the composition in the spray should flow together to form a smooth film, but the resulting film should be not so free-flowing that runs or sags are formed on vertical surfaces.

In solution-type coating compositions where viscosity is a function of the polymer concentration, a moderate decrease in proportion of solvent results in a moderate increase in viscosity until a state of gel is approached. Since low boiling solvents evaporate almost instantly on spray-application, the practice is to control viscosity throughout the phases of application by using a carefully graded mixture of several types of solvents and diluents which each evaporate at different but balanced rates.

In contra-distinction to the established practice in solution-type coating compositions we have found that our new-type dispersion coating compositions for application by spray gun should contain essentially only two very different types of organic liquid. One should be of a low-boiling type so that it evaporates during spray application and the other should be of a high-boiling type and in part may even be non-volatile at room temperature. Ideally the boiling ranges of the two types of liquids should not merge but in practice a small overlap may be tolerated.

The invention may be explained as follows. In dispersions the polymer is present not in solution but as discrete particles and at low polymer contents the viscosity is substantially that of the organic liquid continuous phase. As the liquid evaporates the viscosity rises only slowly until a critical stage is reached. Viscosity then changes rapidly on loss of continuous phase, first through a syrupy state and then through a pasty state, until at the critical packing state where the liquid just fills the voids between the closely-packed disperse particles the composition is of the consistency of solid mud.

It is, therefore, relatively simple to meet the requirements of characteristic (i) above, but to meet the requirements of characteristic (ii) it is important to ensure that when the spray droplets of composition have coalesced on the article being coated the composition is such that this critical stage has just been reached and the composition is in the syrupy state.

Thereafter, evaporation of organic liquid should take place relatively slowly so that the film can flow out smoothly to eliminate spray mottle before the composition reaches the pasty state.

If evaporation continues after the critical packing state, at which the coating is of the consistency of solid mud, then depending on the physical properties of the polymer, e.g. hardness, the coating may crack and these mud-cracks will not disappear on subsequent stoving. In the critical packing state, the coating contains about 35–40% liquid by volume.

In order to meet these critical requirements the proportion of high-boiling liquid to solids in the coating composition should be at least 1:1.6 by volume, preferably in the range from 1:1 to 2:1 by volume. The term solids includes with the film-forming polymer, any pigments, fillers, etc.

The proportion of low-boiling organic liquid is not critical but should, of course, be at least sufficient to bring the composition to a sprayable viscosity. A suitable proportion is about 30% by volume of the composition. More may be added to control the solids content of the composition being sprayed. The major part, or even all, of the low-boiling liquid need not, of course, be added to the coating composition until just prior to its use.

By low boiling organic liquid we mean one which, when spray-applied under operating conditions to the article to be coated, is evaporated by the application; i.e. the sprayed article is found on examination immediately after spraying to be dry. In normal conditions a suitable liquid is, for example, a hydrocarbon boiling in the range 60–120° C.

By high-boiling organic liquid we mean one which suffers substantially no loss by evaporation on spray application. A simple test for this is to spray-apply a mixture of the liquid and a non-volatile liquid plasticiser and analyse a sample of the mixture as deposited on the article being sprayed. If the proportion of liquid to plasticiser is substantially unchanged then the liquid is suitable as a high-boiling liquid for the purpose of this invention. In normal conditions a suitable organic liquid is one boiling in a range about 150° C. If the coated article is to be stoved shortly after coating, then for a stoving temperature of 127° C., a liquid boiling in the range between 150 and 270° C., the major part in the range 180–250° C. is preferred.

If the coated article is not to be stoved for some time after spraying there is a possibility that even some of the high boiling liquids may evaporate from the coating on standing. It is, therefore, a preferred additional feature of our invention that the coating composition should contain a liquid which is non-volatile at room temperature in a proportion, relative to the solids, of at least 1:1.6 by volume.

This non-volatile liquid may be plasticiser for the polymer, and so may be a permanent component of the dry film, or it may be a very high boiling liquid which is evaporated only during the subsequent stoving or it may be a combination of both. In any case, it is to be regarded as high-boiling liquid as previously defined.

The present invention may be applied broadly to coating compositions based on dispersions of polymer in organic liquid. Typical suitable polymers are those of styrene, vinyl toluene, divinyl benzene, diisopropenyl benzene, allyl acetate, diallyl adipate, acrylonitrile, vinyl chloride, vinylidene chloride, vinyl propionate, vinyl acetate, vinyl stearate and acrylates and methacrylates of aliphatic alcohols. The nature of the organic liquid will, of course, depend on the nature of the polymer, i.e. the liquid must not be a solvent for the polymer.

Polymers particularly suitable for use in coating compositions are acrylate polymers by which we mean polymers and copolymers comprising acrylic or methacrylic acid or an ester, amide or nitrile of such an acid. Typical materials which are suitable for use in this invention include polymers of acrylonitrile, acrylates and methacrylates of aliphatic alcohols such as methyl, ethyl, octyl, lauryl and natural fat alcohols. The preferred monomers for use in the production of polymers for the preparation of coating compositions according to this invention are methyl methacrylate, $\beta$-ethoxy ethyl methacrylate, ethyl acrylate, acrylonitrile, methacrylic acid and acrylic acid, and amides of these acids. Combinations of the above monomers may be used and other typical materials which are suitable for use as comonomers include dimethyl itaconate, diethyl maleate and maleic anhydride. Such polymers may be dispersed in relatively non-polar organic liquids such as aliphatic hydrocarbons.

A suitable low-boiling aliphatic hydrocarbon is one boiling in the range 60–100° C., such a hydrocarbon being commercially available under the name Special Boiling Petroleum 2. A suitable high-boiling aliphatic hydrocarbon is a kerosene boiling in the range 180–250° C. A suitable very high-boiling non-polar liquid substantially non-volatile at room temperature is an aliphatic hydrocarbon boiling in the range 250–290° C. Liquid plasticisers suitable for use with acrylate polymers according to the preferred additional feature of our invention include phthalic and adipic esters of aliphatic and aromatic alcohols containing from 4–10 carbon atoms.

The invention is illustrated by the following examples, in which all parts are by weight unless otherwise stated.

EXAMPLE 1

A stable dispersion of methyl methacrylate/methacrylic acid (98:2) copolymer was prepared by polymerising the mixed monomers in aliphatic hydrocarbon containing in solution 2.5% of degraded rubber. The resulting dispersion contained 54% of polymer, 10% of aliphatic hydrocarbon boiling in the range 230–250° C. and 35% of aliphatic hydrocarbon boiling in the range 60–100° C.

16.4 parts of titanium dioxide were dispersed in a mixture of—

| | Parts |
|---|---|
| Methyl cyclohexanyl phthalate | 15.4 |
| Aliphatic hydrocarbon (B.P. 230–250° C.) | 2.5 |
| Dispersing agent | 0.5 | by grinding in a ball mill. 47.5 parts of the polymer dispersion were then added to the ball mill.

Before the resulting pigmented polymer dispersion was sprayed onto an article it was diluted with 1 part in 16 by volume of aliphatic hydrocarbon boiling in the range 230–250° C.

After standing for about 15 minutes the spray-coated article was stoved at 127° C. for half an hour.

EXAMPLE 2

A stable dispersion of a styrene/ethyl acrylate/acrylonitrile (65:25:10) copolymer was prepared by polymerising the mixed monomers in methanol containing in solution a long chain polyethylene glycol acrylate. The dispersion contained 50% of dispersed polymer.

40 parts of titanium dioxide were ground in 45 parts of ethylene glycol and to the resulting pigment dispersion were added 200 parts of the pigment dispersion and 55 parts of ethylene glycol.

The resulting pigmented polymer dispersion was used to spray-coat articles, a few percent of methanol being added to adjust the viscosity to a value most suitable for spraying.

We claim:

1. A coating composition adapted for spraying onto articles in which the vehicle consists essentially of a non-thixotropic, non-flocculated dispersion in an organic liquid of particles of a film-forming polymer which is insoluble in said organic liquid and a stabilizing agent having one constituent which is solvated by said organic liquid and another constituent which is compatible with said film-forming polymer, said organic liquid consisting essentially of a high-boiling organic liquid which suffers substantially no loss by evaporation on spray application under normal operating conditions such that when a mixture of said high-boiling organic liquid and a non-volatile liquid plasticizer is spray applied the liquid deposited will contain substantially the same proportion of high-boiling liquid to non-volatile plasticizer as the liquid mixture which is sprayed, in proportion, relative to the solid content of the composition, of at least 1:1.6 by volume, and low-boiling organic liquid which, when spray applied under normal operating conditions to an article to be coated, is evaporated by the application such that the sprayed article is found on examination immediately after spraying to be dry, in an amount sufficient to render the composition sprayable, said high-boiling organic liquid boiling above 150° C., the major part boiling above 180° C. and said low-boiling liquid boiling in the range 60–120° C.

2. A coating composition as claimed in claim 1 in which the proportion of said high-boiling organic liquid, relative to the solid content of the composition, is in the range from 1:1 to 2:1 by volume.

3. A coating composition as claimed in claim 2 in which the proportion of said high-boiling organic liquid, relative to the solid content of the composition, is about 1:1.

4. A coating composition as claimed in claim 1 which contains about 30% by volume of said low-boiling organic liquid.

5. A coating composition as claimed in claim 1 in which part of said high-boiling organic liquid boils in a range between 150 and 270° C. and part in a range between 250 and 290° C.

6. A coating composition as claimed in claim 1 in which said film-forming polymer comprises an acrylate polymer.

7. A coating composition as claimed in claim 1 in which at least one of said high-boiling and low-boiling liquids comprises an aliphatic hydrocarbon.

8. A process for applying a coating to an article which comprises spraying onto the article under said normal operating conditions a coating composition as claimed in claim 1.

9. An article which has been coated with a composition as claimed in claim 1.

10. A coating composition adapted for spraying onto articles in which the vehicle consists essentially of a non-thixotropic, non-flocculated dispersion in an organic liquid of particles of a film-forming polymer which is insoluble in said organic liquid and a stabilizing agent having one constituent which is solvated by said organic liquid and another constituent which is compatible with said film-forming polymer, said organic liquid consisting essentially of a high-boiling organic liquid which suffers substantially no loss by evaporation on spray application under normal operating conditions such that when a mixture of said high-boiling organic liquid and a nonvolatile liquid plasticizer is spray applied the liquid deposited will contain substantially the same proportion of high-boiling liquid to non-volatile plasticizer as the liquid mixture which is sprayed, in proporton, relative to the solid content of the composition, of at least 1:1.6 by volume, and low-boiling organic liquid which, when spray applied under normal operating conditions to an article to be coated, is evaporated by the application such that the sprayed article is found on examination immediately after spraying to be dry, in an amount sufficient to render the composition sprayable, said high-boiling organic liquid boiling above 150° C. and said low-boiling liquid boiling in a range between 60 and 120° C.

References Cited

UNITED STATES PATENTS

| | | | |
|---|---|---|---|
| 2,946,702 | 7/1960 | Bach | 260—33.6 |
| 3,095,388 | 6/1963 | Osmond et al. | 260—33.6 |

OTHER REFERENCES

Payne: Organic Coating Technology, vol. I, 1954, John Wiley & Sons, Inc., pp. 515–517, 632, Sci. Lib., TP935 P38.

Doolittle: The Technology of Solvents and Plasticizers, John Wiley and Sons, Inc., 1954, pp. 85–87.

MORRIS LIEBMAN, *Primary Examiner.*

L. T. JACOBS, *Assistant Examiner.*